Jan. 2, 1940.                    J. T. FERRY                      2,185,841
                              TABULATING MACHINE
                          Filed Dec. 24, 1936            15 Sheets-Sheet 1

INVENTOR.
JOHN T. FERRY
BY *H. A. Sparks*
ATTORNEY

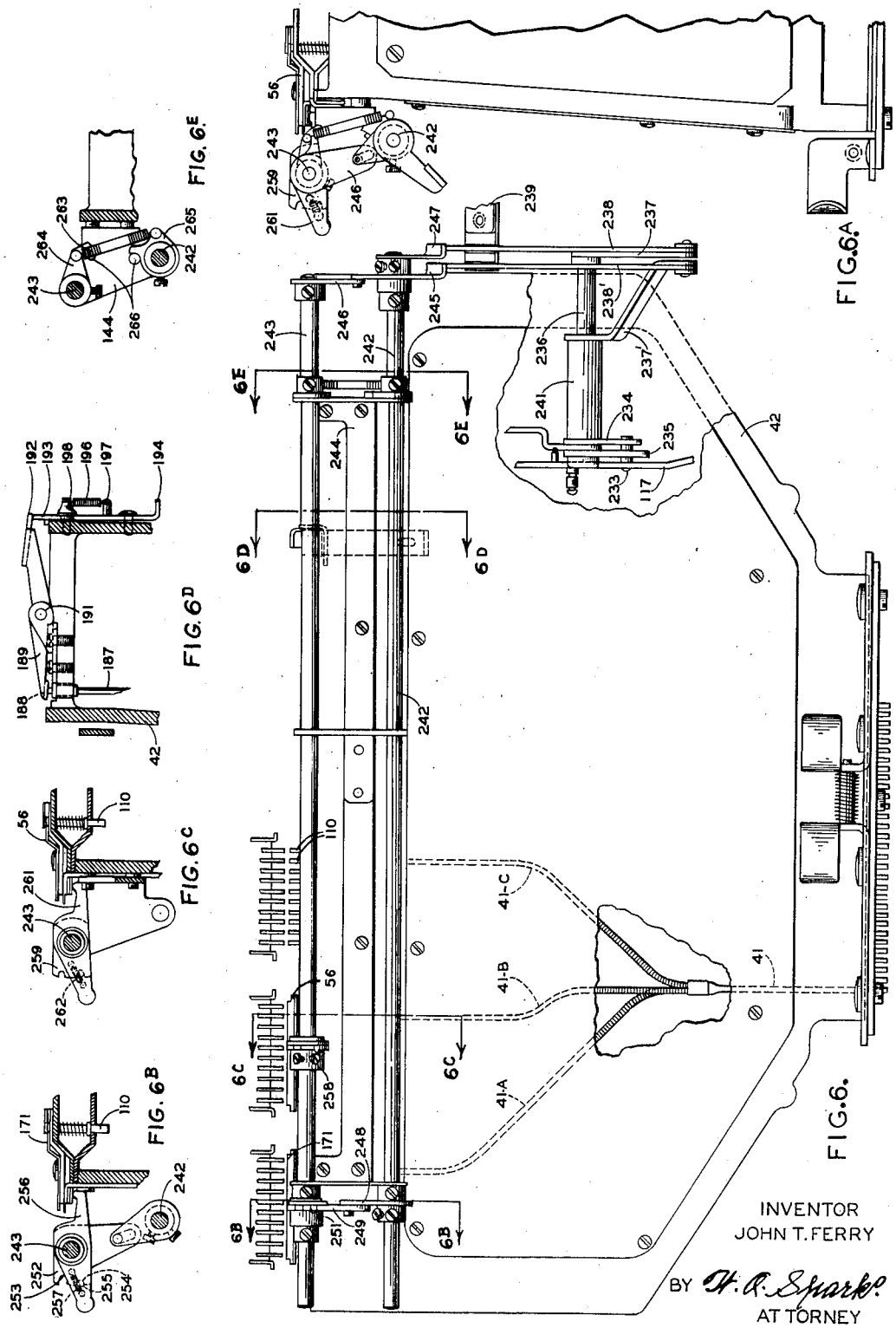

Jan. 2, 1940.　　　　J. T. FERRY　　　2,185,841
TABULATING MACHINE
Filed Dec. 24, 1936　　　15 Sheets-Sheet 7

INVENTOR
JOHN T. FERRY
BY H. A. Sparks
ATTORNEY

Jan. 2, 1940.          J. T. FERRY                2,185,841
                    TABULATING MACHINE
              Filed Dec. 24, 1936         15 Sheets-Sheet 8

INVENTOR
JOHN T. FERRY

BY *H. A. Sparks*
ATTORNEY

Jan. 2, 1940.　　　　J. T. FERRY　　　　2,185,841
TABULATING MACHINE
Filed Dec. 24, 1936　　　15 Sheets-Sheet 9
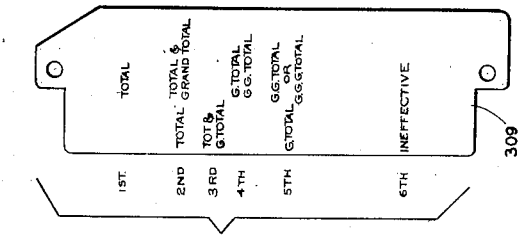
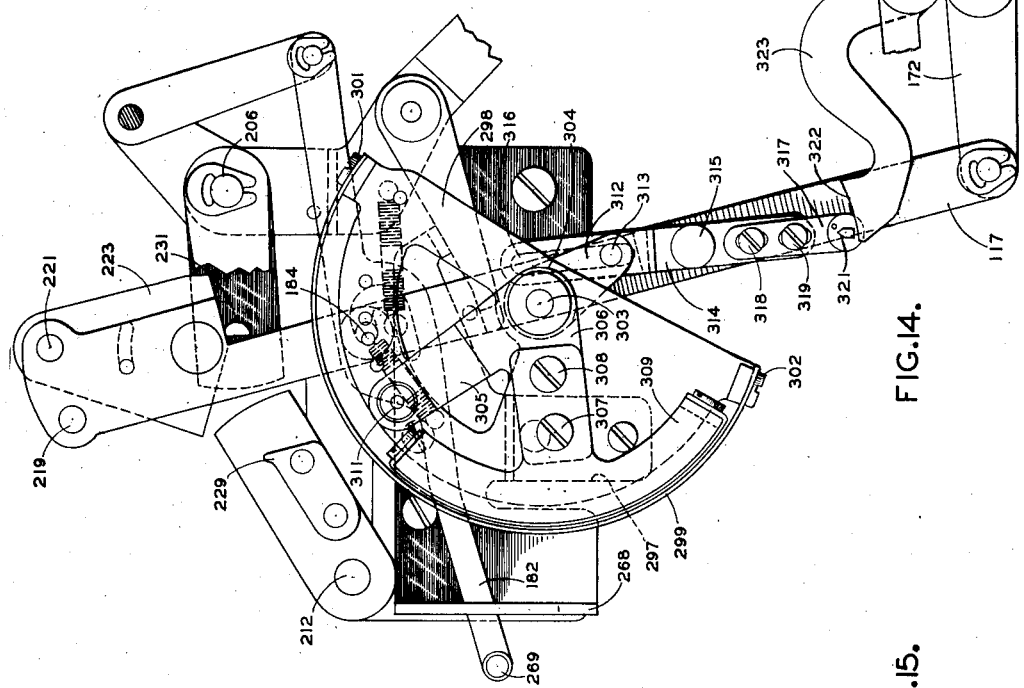
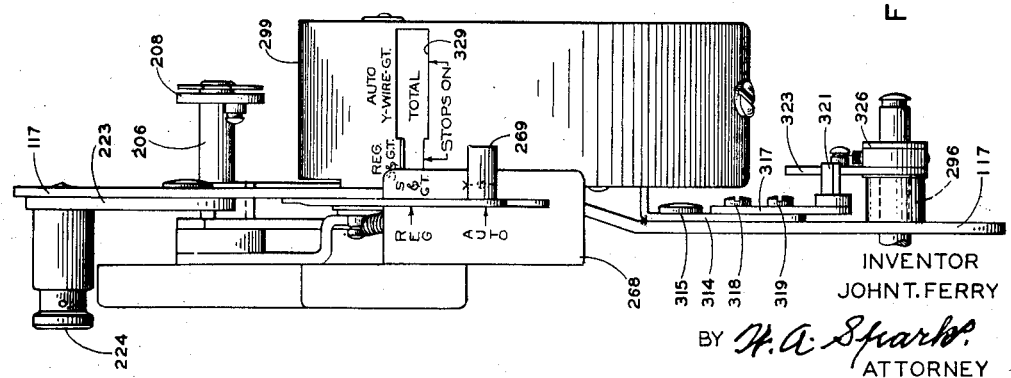
INVENTOR
JOHN T. FERRY
BY H. A. Sparks
ATTORNEY Jan. 2, 1940.  J. T. FERRY  2,185,841
TABULATING MACHINE
Filed Dec. 24, 1936    15 Sheets—Sheet 11

INVENTOR
JOHN T. FERRY
BY *H. A. Sparks*
ATTORNEY

Jan. 2, 1940.    J. T. FERRY    2,185,841
TABULATING MACHINE
Filed Dec. 24, 1936    15 Sheets-Sheet 12

INVENTOR
JOHN T. FERRY

BY *H. R. Sparks*
ATTORNEY

Jan. 2, 1940.   J. T. FERRY   2,185,841
TABULATING MACHINE
Filed Dec. 24, 1936   15 Sheets-Sheet 14

INVENTOR
JOHN T. FERRY
BY W. A. Spark
ATTORNEY

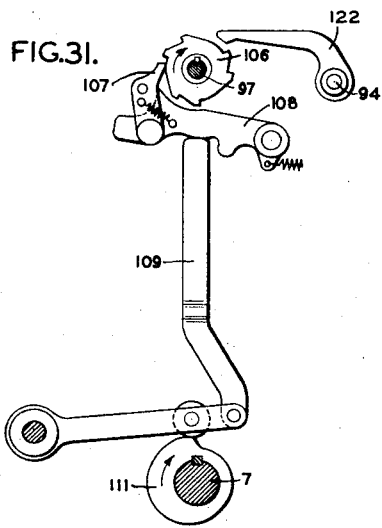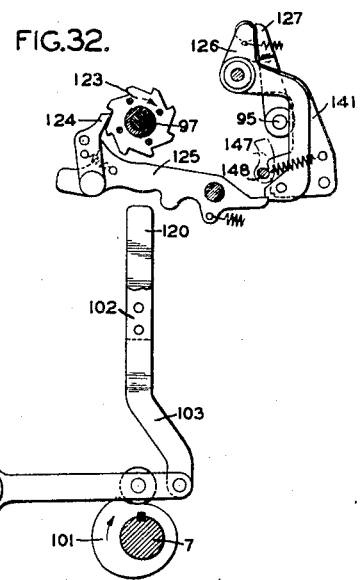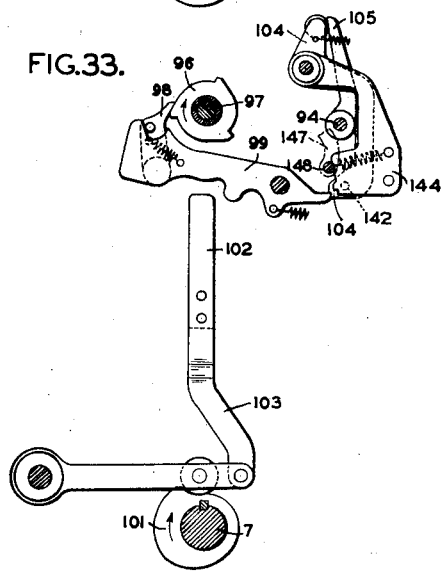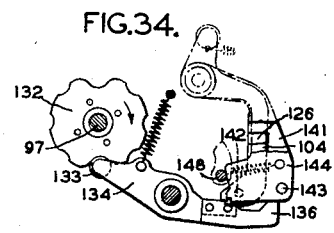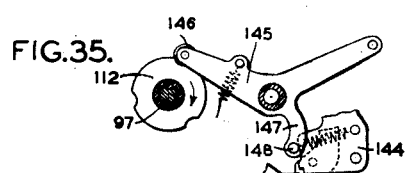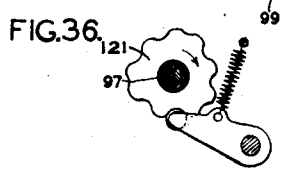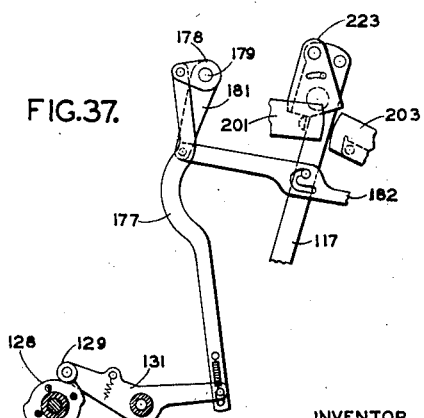

Patented Jan. 2, 1940

2,185,841

UNITED STATES PATENT OFFICE 2,185,841

TABULATING MACHINE

John T. Ferry, Ilion, N. Y., assignor to Remington Rand Inc., Buffalo, N. Y., a corporation of Delaware Application December 24, 1936, Serial No. 117,552

11 Claims. (Cl. 235—61.7)

This invention relates generally to tabulating machines and particularly to automatic stopping means adapted to be controlled by any one of a plurality of total taking control mehcanisms in a tabulator.

In certain accounting operations carried out on a tabulator it may be desirable to obtain a printed report covering the records of the various departments in a company and also to obtain separate reports covering certain particular departments only. It is necessary, therefore, that the tabulator be momentarily stopped at a predetermined point in its operation in order that a single copy work sheet may be inserted in the machine and also that the machine be again stopped and the sheet withdrawn after the desired information has been printed thereon. To meet this requirement there has been designed a manually settable automatic stopping device controlled by the total taking mechanism which may be preset to disengage the machine clutch and thus stop the tabulator after a certain predetermined total taking operation.

Cooperating with the stopping device of the invention is certain accumulating and total control mechanism which, briefly considered, comprises three separate accumulating units all situated in the front of the machine and in which the same record items are entered simultaneously through the medium of Y-wiring in the translator. An automatic total control unit, the operation of which is initiated upon a change in the designating fields of a card, operates to release the values accumulated in two accumulator units while a specially perforated control card is used to release the third unit. Sets of accumulator wheels are also provided at the rear of the machine and under a modified condition of operation, to be described in the body of the specification, are permitted to clear and print their accumulated values. All of the front accumulating units may be released independently of one another so that the machine is capable of four different operations each productive of a different total. Under another condition of operation to be described later, all of the front accumulators may be released together to print their respective totals at the same time.

The initiating means for governing the release and retention of the several accumulating units is considered in greater detail further in the specification.

One object of this invention is to increase the flexibility and add to the usefulness of the Powers tabulator by providing a selective automatic stopping means controlled by the total control mechanism, that is variably effective at the will of the operator.

Another object of this invention is to disengage the machine clutch of a tabulator after a predetermined one of several total taking operations by presetting a selective automatic stopping device which will be effective only in accordance with its setting.

Another object of this invention is a settable automatic stopping device which cooperates with the total control mechanism and particularly with an operating link of the total control mechanism to transmit the motion of the operating link to the regular tabulator stopping mechanism to disengage the machine clutch.

From the foregoing introduction it may be seen that the mechanism of the invention comprises a variable automatic stopping device which may be preset to cooperate with the regular tabulator stopping mechanism to disengage the machine clutch after a predetermined total operation. The invention is embodied in a tabulator having the usual card feeding, sensing and recording mechanisms common to this type of machine and which is also provided with mechanism for accumulating totals, grand totals, great grand totals and great great grand totals and also control mechanism for effecting the release of said totals automatically and independently of one another.

Other objects and structural details of the invention will be apparent from the following description when read in connection with the accompanying drawings, wherein, Figs. 1 and 2 taken together constitute a right hand view in cross section of the tabulator showing portions of the base mechanisms, the translator and various head mechanisms.

Figs. 3 and 4 taken together constitute a view in exploded isometric of the automatic total and grand total control mechanism in rest position.

Fig. 6 is a rear view of the translator partially broken away to show the means for raising the naught block.

Fig. 6A is a partial right hand view of the translator as shown in Fig. 6.

Figs. 6B, 6C, 6D, and 6E are detailed sectional views of certain controlling mechanism mounted on the translator.

Figs. 7 to 13, inclusive, are partial views of the total pull link and certain associated elements in the various positions they assume during the several total taking strokes.

Fig. 14 is a view in side elevation of the variable automatic stopping device and shows its cooperation with the total control mechanism and the stop shaft of the machine.

Fig. 15 is a front view of the mechanism shown in Fig. 14.

Figure 16:
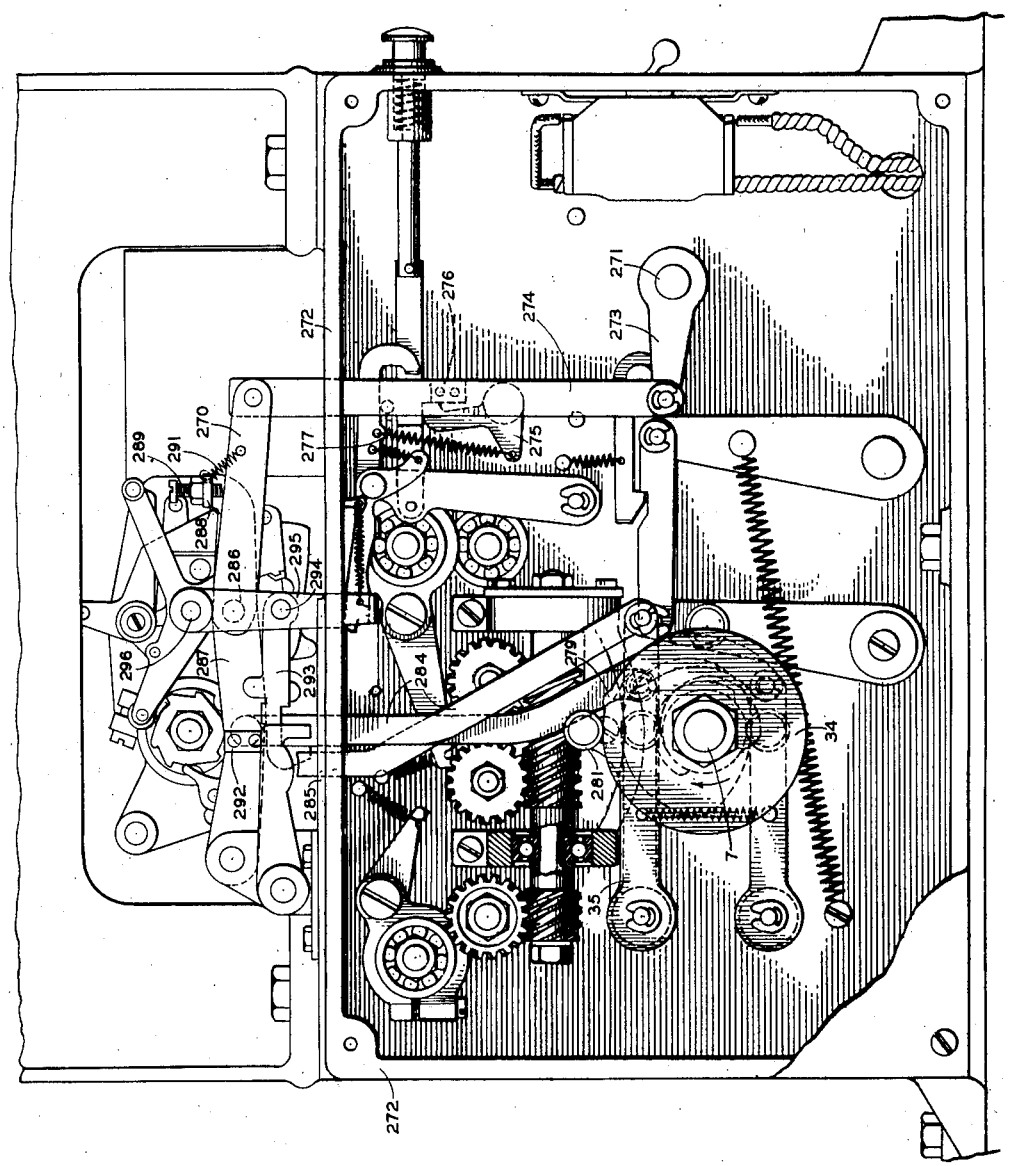
Figure 22:
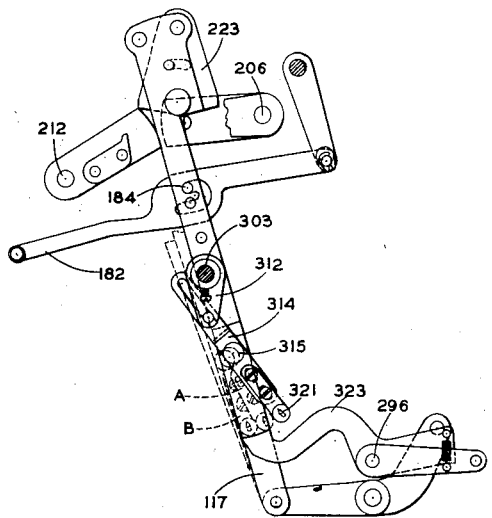

Fig. 16 is an elevational view taken from the left hand side of the machine and shows the mechanism for engaging and disengaging the machine clutch.

Figure 17:
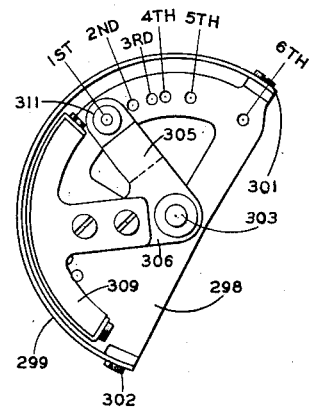

Fig. 17 is a view showing the two drum like members of the automatic stopping device and the means for positioning the inner drum relatively to the fixed outer drum.

Fig. 18 is a front view of the inscribed casing of the inner drum member of the automatic stopping device.

Figs. 19 to 25, inclusive, are partial views of the total pull link, certain of its associated elements and the actuating lever of the automatic stopping device and are intended to show the relative effective and ineffective positions of the actuating lever for each index position of the stopping device and according to the several lateral pulling positions of the total link.

Figure 26:
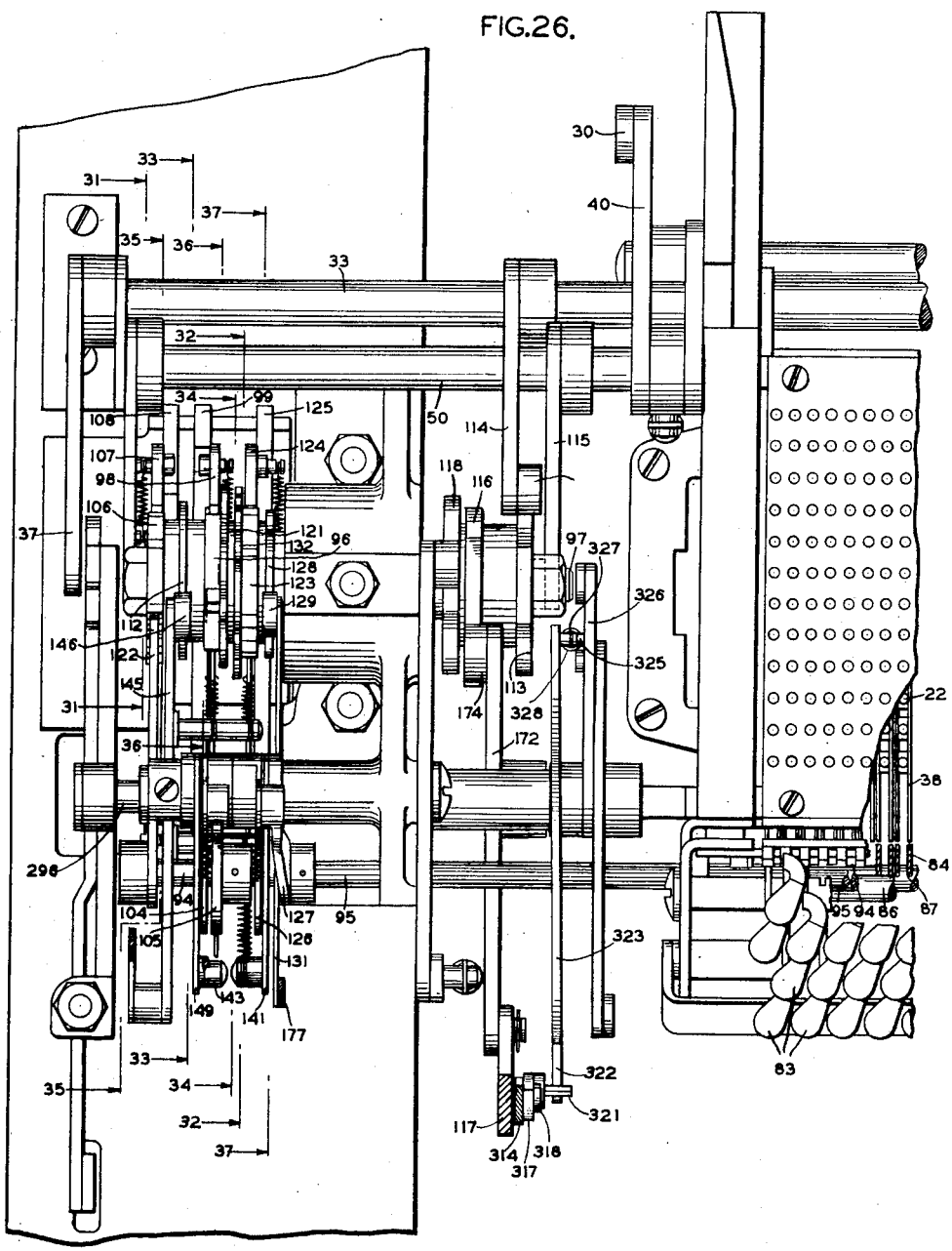
Figure 27:
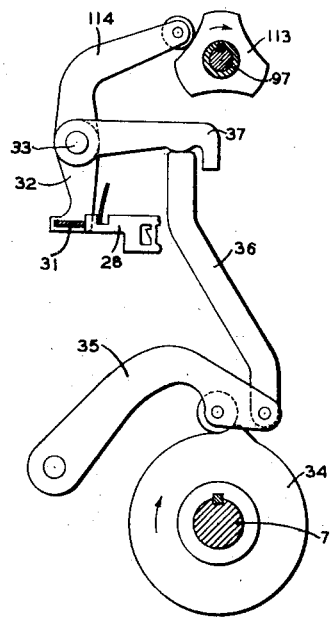
Figure 28:
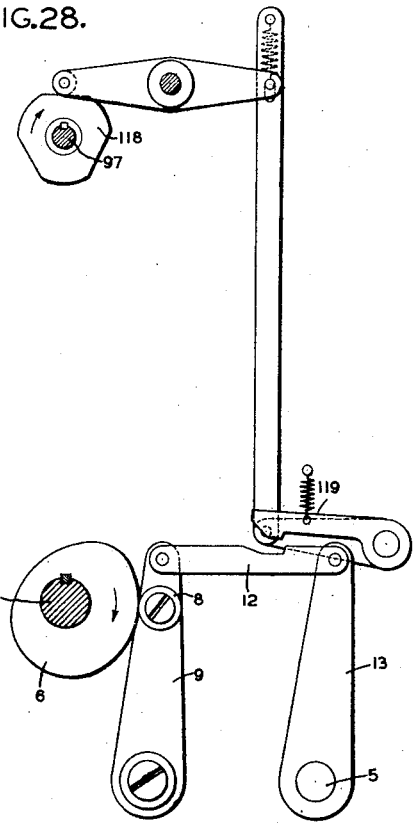
Figure 29:
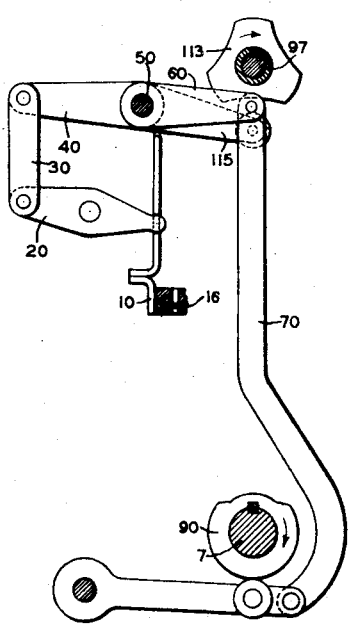
Figure 30:
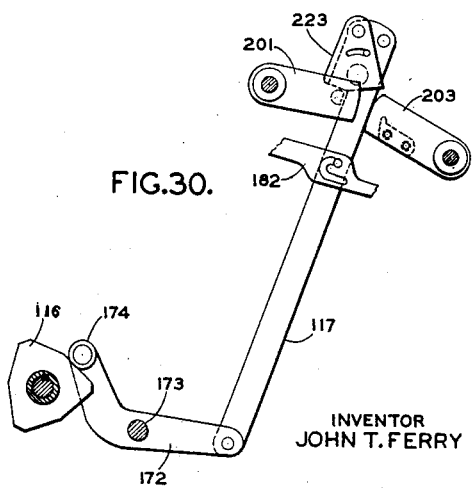

Fig. 26 is a fragmentary plan view of the base of the machine showing principally the position of the mechanism comprised in the total control unit.

Figs. 27 to 30 are detail views in side elevation of three cams of the total control unit and their associated linkage.

Figs. 31 to 37 are detailed side views of individual elements of the total control unit and their associated mechanism, each view being taken along the respective line indicated in Fig. 26.

*General description*

With the improvement and modifications disclosed herein the mechanism of the present invention is applicable to a standard tabulator of the type disclosed in the patents to Lasker No. 2,044,119 and 2,151,406. The mechanism herein described as old is understood to refer to those features and functions of the Powers tabulator which, through public commercial use and frequent formal disclosures, have become well known in the punched card accounting machine field.

The tabulator is generally considered as being divided into three cooperating sections or parts. The base section comprising the card feeding, sensing and designating means; the intermediate section comprising a translating or reading transmitting means; the head section comprising in general the printing and computing mechanism.

The mechanism of the base is, for the most part, the same as that disclosed in Patent No. 2,044,119. The exceptional features of the present application, along with the essential base mechanisms, are described below.

Figure 3:
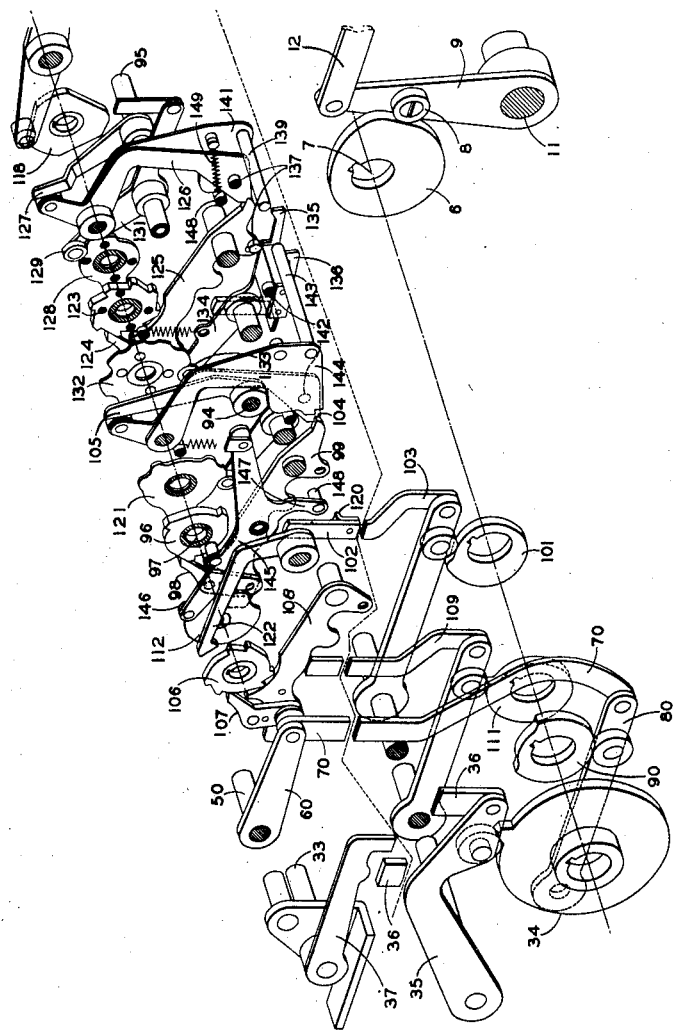
Figure 4:
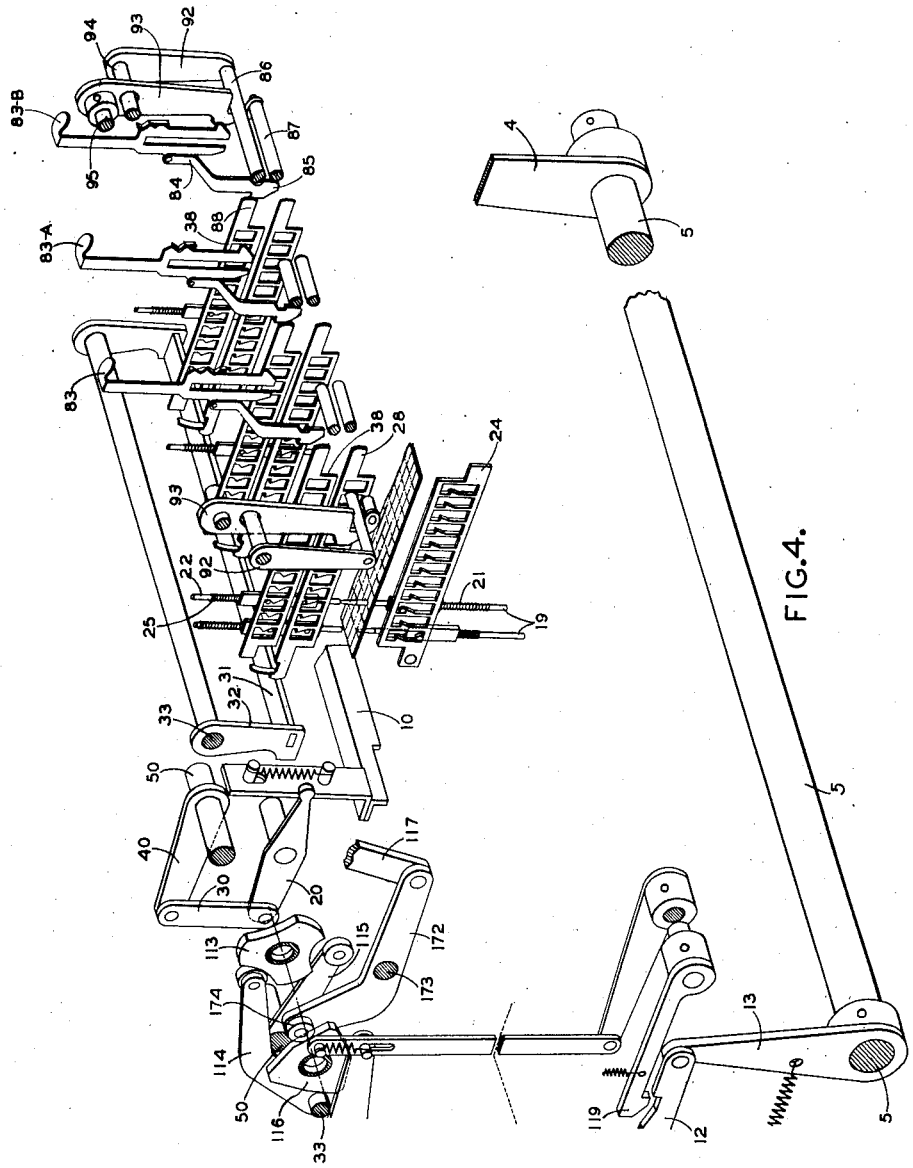

A card hopper 1 (Fig. 1) is provided at the front of the machine and is intended to receive a pack of perforated record cards which have been suitably arranged for tabulation. The cards may be ejected from the hopper seriatim by a picker knife and block 2. The block 2 is connected by link 3 and arm 4 to a rock shaft 5. The shaft 5 is ordinarily rocked once for every cycle of the machine by a cam 6 (Fig. 3) on the main shaft 7. The shaft 7 is motor driven in the usual manner and carries a series of cams appropriately formed and placed to perform their various functions. As shown in Figs. 3 and 4, the cam 6 bears against a follower roller 8 on the arm 9 which is mounted on the shaft 11 and is connected by a link 12 to an arm 13 fast to the shaft 5. Referring again to Fig. 1, the ejected card is fed between a pair of continually driven feed rollers 14 and 15 and thereby into the sensing chamber 16. The card is held in the sensing chamber by the usual card stop 10 normally actuated, once for each cycle of the machine, by mechanism comprising pivot arm 20, link 30, arm 40 (Figs. 1, 3 and 4), shaft 50, arm 60, link 70, and arm 80 which cooperates with cam 90 on the main shaft 7. The lower pin box 17 is moved in vertical reciprocation once for every cycle of the machine by an eccentric strap assembly 18 on the shaft 7. The pins 19, carried by the pin box 17, are urged upwards by springs 21 and are adapted to pass through the perforated plates which comprise the sensing chamber 16. When a card is in the chamber only those pins 19 which are in respective alignment with the perforations in the card will pass through the sensing chamber and be in position to contact and elevate the pins 22 of the upper stationary pin box 23. The pins 19 which encounter no card perforation are ineffective. A positive driving action is given to the elevated effective pins 19 by reason of their cooperation with a locking slide 24. The pins 22 are driven upwards against the tension of springs 25 and are provided with horizontally projecting pins or extrusions 26 and 27. The pins 22 are provided in rows of twelve. Six pins of each row have their extrusions 26 and 27 extending to the right (as viewed from the front of the machine), while the extrusions on the other six pins project to the left. The pins 26 on each row of pins 22 coact with a pair of locking slides 28 in the manner illustrated in Fig. 1 in order that the elevated pins 22 may be locked in their raised position. The locked pins are released near the end of each machine cycle by action of a retract bail 31, secured between a pair of arms 32 on the shaft 33. By reference to Figs. 3 and 4, it may be seen that cam 34 on the main shaft 7 is so formed as to elevate arm 35 and its associated link 36 once for every rotation of the shaft 7. In its elevated position, link 36 will contact and raise an arm 37 fast to the shaft 33, thereby rotating the shaft 33 and the dependent bail 31 in a counter-clockwise direction, as viewed in Fig. 4 to release the pins 22.

The pins 27 coact with a pair of slides 38 (Figs. 1 and 4) in a manner similar to the cooperation between pins 26 and slides 28 and 29 and impart to them a lateral forward movement. The function of the slides 38 is to initiate an automatic total taking operation through means which will be considered in greater detail further on in the present description. A more detailed discussion of the card feeding and sensing means may be found in the aforementioned Patent No. 2,044,119.

Figure 1:
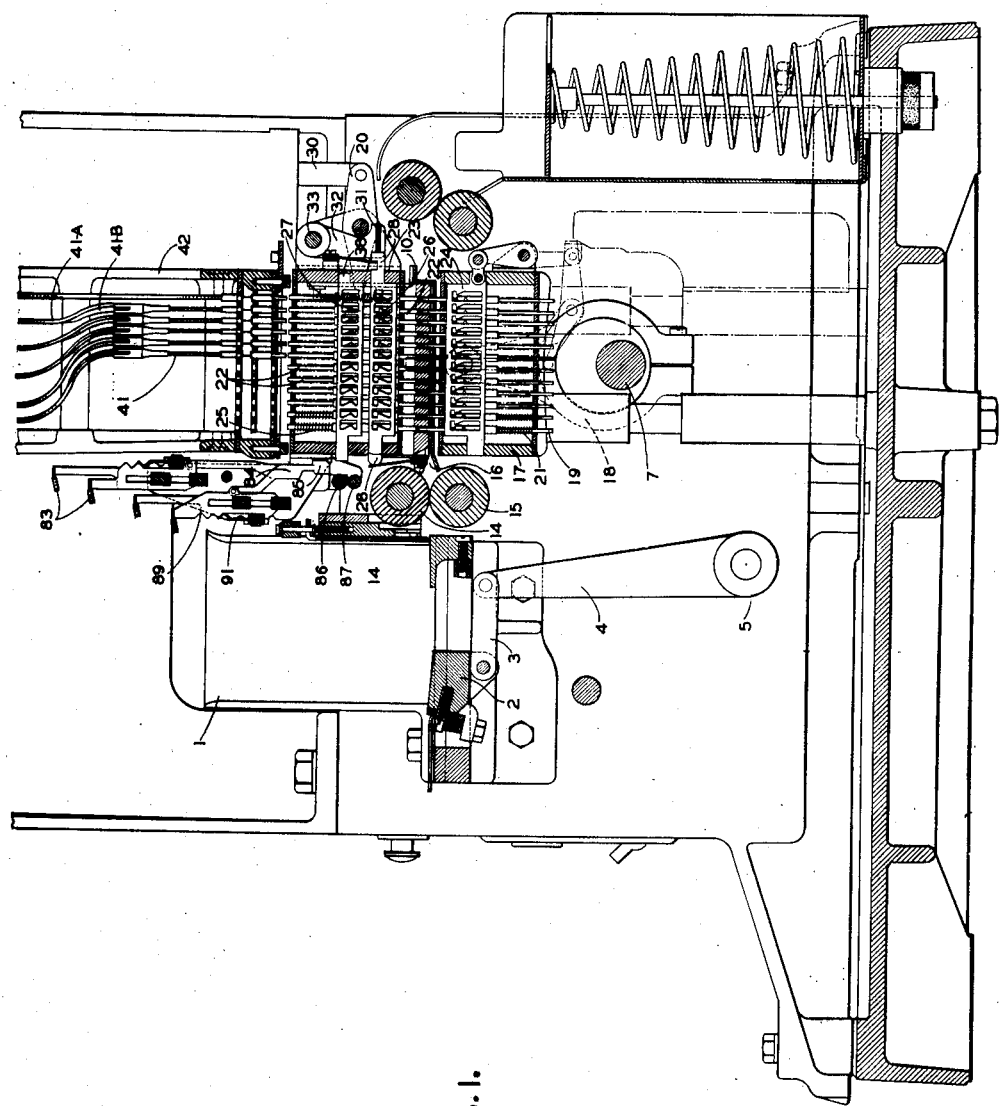

Elevation of the pins 22 will cause a corresponding movement of the wires 41 in the translator 42. As shown in Fig. 1 and Fig. 6 the translator wires 41 of the machine end in a joint or cup from each of which extend three separate wires 41a, 41b and 41c. Each wire leads into and forms a part of a different translator unit.

Figure 2:
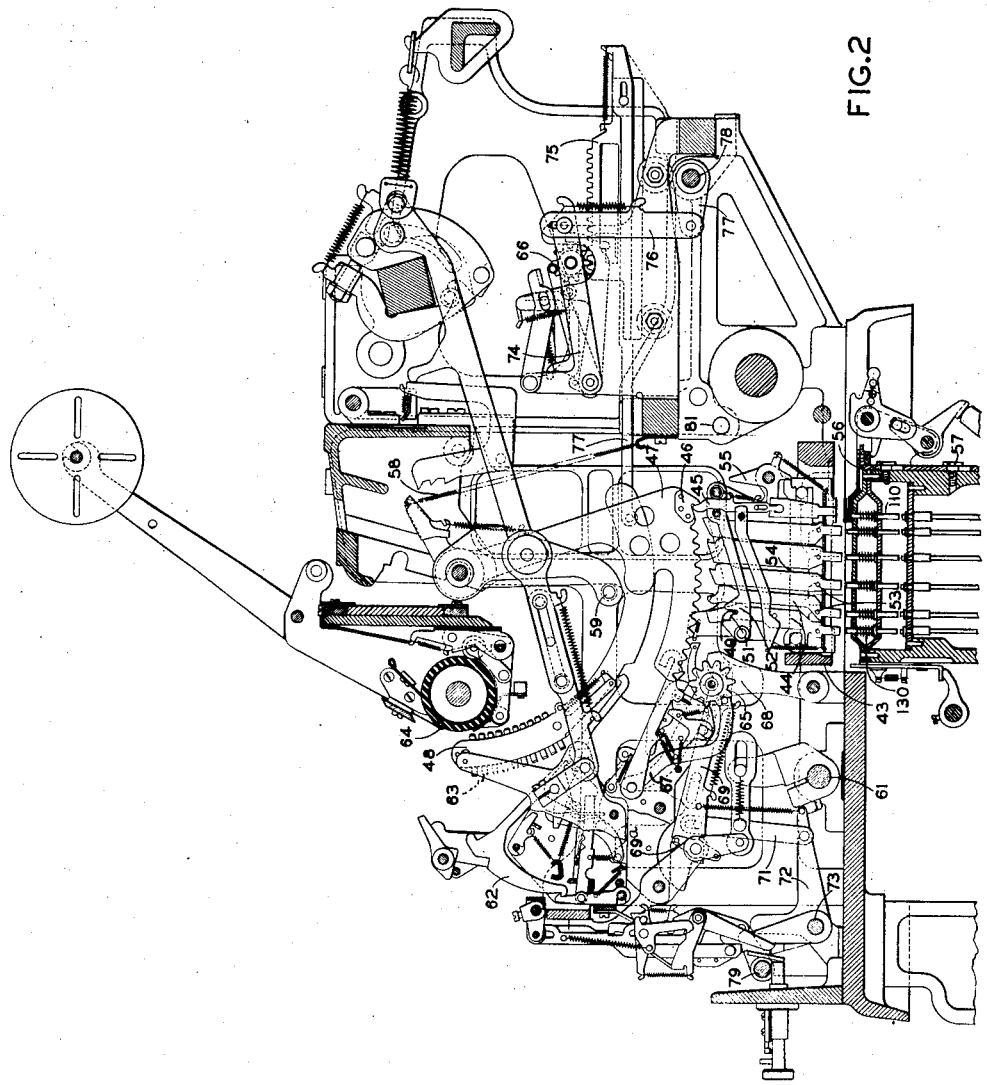

In an example shown in Figs. 1 and 2 Bowden wires of a usual construction are used in the translator. Positioned above each wire 41a, 41b and 41c is a spring-pressed pin or interponent 110 adapted to be moved upward against the tension of its spring 130 to transmit the motion of the Bowden wires to the stop bars hereinafter described.

Positioned in the head of the machine (Fig. 2) and just above each of the translator units is a stop basket 43 comprising numeral stop bars 44 and a normally effective zero stop 45. There are five stops 44 representing, in order from right to left, the odd numerals 1, 3, 5, 7 and 9. To obtain an even numeral the nine stop is raised and along with it is raised the numeral stop which corresponds to the odd digit which is one lower than the desired even numeral. To illustrate—the numeral four would result from movement of the nine stop bar and the three stop bar.

The heel 46 on the accumulator sector 47 normally contacts the zero stop 45 and when released will swing forward with the type sector 48 to a position determined by a stop 44. Vertical movement of the nine stop bar will dislodge its pin 49 from the notch 51 in the fixed arm 52, thereby permitting the assembly of stop bars 44 of that denomination to move forward an extra space when one of their number has been contacted by the heel 46. If the nine bar alone has been raised there will be, of course, no movement of the other bars 44. The stop basket shown in Fig. 2 is of a conventional type and, in its essential details, is the same as that shown in U. S. Patent to Lasker No. 1,780,621. The zero stop 45 is withdrawn from its restraining position upon the elevation of any of the numeral stops 44 by means of pins 53 on said stops, cam slide 54 and bellcrank 55.

Under certain conditions of machine operation, to be later described, the zero stops of some units 43 will be held upward in effective retaining position by the action of naught blocks, one of which is indicated at 56, slidably mounted at 57 to the translator frame 42.

The type sectors 48 and their associated accumulator sectors 47 are allowed to swing forward under tension of the spring 58 once each machine cycle through the release of bail 59. The printing mechanism comprising hammer 62, type lugs 63 and platen 64 is also shown in part in Fig. 2.

The accumulating mechanism may be the same as that disclosed in the U. S. Patent No. 2,151,406 and comprises front accumulator wheels 65 which may mesh with the accumulator sectors 47 on either their forward or return stroke. Another set of accumulator wheels which are similar in design and function to the wheels 65 are located at the rear of the machine and indicated by the reference numeral 66. Each set of wheels 65 is supported by a pair of arms 67 and is adapted to be put into mesh with the teeth on the sector 47 at a time determined by the movement of arm 69, lever 69a, and its actuating mechanism (not shown), link 71 and arm 72 on the total shaft 73.

The rear accumulator wheels 66 are supported by a pair of arms 74 and mesh with racks 75 during a period of the machine cycle determined by timing mechanism comprising, in part, link 76, arm 77, shaft 78 and grand total shafts 79 and 81.

In the ordinary adding operation of the machine the accumulating wheels 65 and 66 are withdrawn from their respective racks 47 and 75 at the start of the cycle. At the beginning of the return stroke of an adding cycle and after the type sectors 48 have reached their farthest forward position the wheels are permitted to move into mesh with their racks and receive a registration determined by the extent of return movement of the type sectors 48. The timing of the accumulator units during total taking cycles is as follows:

On a total operation the front wheels 65 are allowed to remain in mesh with the sectors 47 during the forward stroke of the type sectors 48. The wheels 65 will rotate until they have cleared by reaching zero and after the printing operation will be withdrawn before the sectors 48 begin their return stroke. During this total operation the rear or grand total accumulating wheels 66 are in the non-add position to which they are automatically set upon actuation of shaft 73. All of the wheels 66 will, therefore, retain their accumulation during total strokes.

A grand total is obtained by reversing the above described procedure. On a grand total stroke the type sectors 48 will be governed by the extent of movement of the wheels 66 and the racks 75 as the former are returned to zero. The front wheels 65 are in non-add position during this operation.

Figure 8:
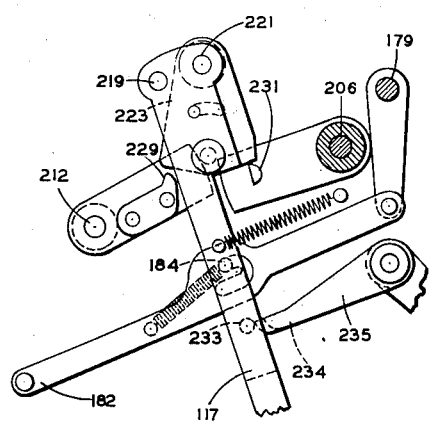
Figure 19:
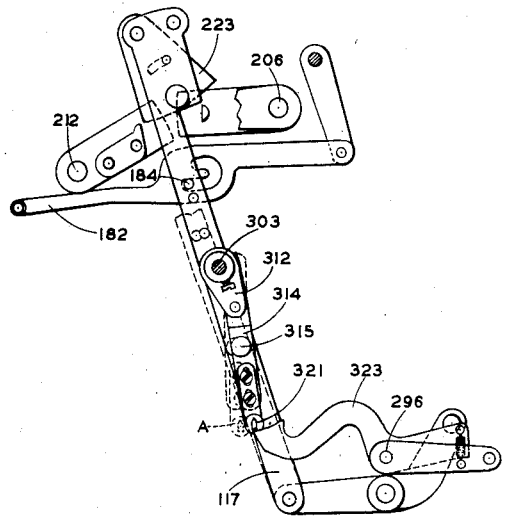

The controlling mechanisms operable by the grand total shafts 79 and 81 are not shown herein but are, or may be, the same as those shown in the aforementioned Patent 2,151,406. The shaft 81 is connected directly to the rear accumulator engaging and disengaging mechanism and, when rocked, serves to alter the timing of this mechanism to permit the total to be taken from the wheels 66. The shaft 79 is rocked simultaneously with the shaft 81 and, through means not herein shown causes the front accumulator wheels 65 to remain in a non-add position for the duration of a grand total taking operation. Control shafts corresponding to the shafts 73, 79, and 81, are shown in Figs. 2 and 19 of Patent 2,151,406 where they are numbered, respectively, 8, 7, and 164. The engaging and disengaging mechanism for the rear accumulator is shown in Fig. 8 of that patent and this figure, in conjunction with Fig. 19 thereof, shows the means whereby the operation of this mechanism is modified, under control of the shaft 164 (81 herein), to cause a total taking operation in the rear accumulator, and under the control of shaft 8 (73 herein) to set the rear accumulator for a non-add operation. Fig. 19 of that patent also shows the means, operable by shaft 8 (73 herein), for setting the front accumulator control mechanism to cause a total taking operation in the front accumulator, and the means operable by shaft 7 (79 herein) for setting this mechanism to cause a non-add operation in the front accumulator.

*Total taking control mechanism*

In Figs. 1, 3 and 4 hereof is illustrated certain automatic total control mechanism for initiating total taking operations upon a change in the designatory matter in a card.

The mechanism shown herein is a modification of the automatic total control means disclosed in the previously cited Patent No. 2,044,119.

As disclosed in the above patent the automatic total control mechanism comprises a normally ineffective control unit adapted to function only during a total taking operation and which is set in motion upon the sensing of a card bearing new designatory matter. As the new designatory matter is sensed certain actuating slides in the sensing chamber cooperate with their associated pre-positioned interponents to trip the total control mechanism to place it under the control of the main shaft and thus initiate a total taking operation. During a total taking operation the control mechanism operates in a series of steps first to disable the card feeding and recording means and to hold the card in the sensing chamber, then to effect a total taking operation and finally to restore the operating mechanism to normal, sense and compute the information contained on the new card and to render the total control unit again ineffective.

In the machine of the cited patent, the result of the above operation is to rock the total shaft 73 connected to the front accumulators of the computing mechanism and cause the printing of a total.

The automatic total control mechanism of this application permits both a total and a grand total taking operation to be initiated automatically upon a columnar change in the designatory fields of a card. Mechanism additional to that disclosed in Patent No. 2,044,119 has been provided for this purpose while the mechanism of that patent has been modified to cooperate with the new grand total mechanism.

Briefly stated the present automatic total and grand total control unit may be considered as comprising two totaling mechanisms, each having individual tripping means. One portion of the control mechanism is similar in function and operation to the mechanism of the abovementioned patent and operates to secure the usual group total. The additional or grand total mechanism operates to effect two successive operations of the group total mechanism, during the second of which an operating link of the total control mechanism is shifted to initiate a grand total taking operation.

Therefore, it may be seen that group total taking operations may be accomplished independently of the grand total mechanism and that a grand total operation must first be preceded by a total operation.

The change-of-designation necessary to bring about these operations may occur in a minor designating field on the card, and this causes a group total taking operation, or it may occur in a major designating field and cause a grand total taking operation which will automatically be preceded by a total operation.

The following is a more detailed discussion of the automatic total control mechanism in its new form including the means for tripping said mechanism upon a change in designation.

Referring now to Figs. 1 and 4 it may be seen that located above and in front of the upper pin box 23 is a series of hand settable positioning members 83 formed as illustrated therein and equal in number to the slides 38. Each member 83 has a depending interponent 84, the head 85 of which may be interposed between either of two bail rods 86 or 87 and the nose 88 of a change-of-designation slide 38. All of the members 83 are adapted for manual movement, whereby they may be positioned in any of three vertical positions. The cooperation of notches 89 in the members 83 with a retaining spring 91 serves to hold the members in their set positions. In its highest, or ineffective, position, the head 85 of the interponent 84 is raised out of the path of movement of slide 38 and thus is unable to rock either bail rod 86 or 87. In its second position, indicated at 83a in Fig. 4, the interponent head 85 lies between slide 38 and the upper bail rod 86.

In its third position, indicated at 83b, the interponent head 85 lies between the nose 88 of the slide 38 and the lower bail rod 87. The bail rod 86 extends between a pair of arms 92 while the rod 87 is supported by a somewhat similar pair of arms 93. The arms 92 and 93 are fast to their respective shafts 94 and 95. As shown in Fig. 4 the lower part of each arm 93 has a recess or cutout portion, the inner edge of which bears against the bail rod 86. From the shape of arms 93 and the relative position of interponent 84, bail rod 86 and 87 and nose 88, it will be seen that in accordance with the setting of an interponent 84, its associated control slide 38 may be entirely ineffective, or it may cause the rocking of bail rod 86 alone, and hence shaft 94, or it may cause the rocking of bail rods 87 and 86 together as well as their respective shafts 95 and 94. The bail rod 86 may thus be rocked alone whereas the rocking of bail rod 87 is accompanied by a simultaneous rocking of bail rod 86.

Referring to Figs. 3 and 26, the mechanism for controlling group total operations, comprises in part a three tooth ratchet 96 secured to a shaft 97 (see also Fig. 33), an actuating pawl 98 therefor and a pawl lever 99. This pawl lever is actuated by cam 101 on the main shaft 7, and one branch 102 of the forked push rod 103, upon disengagement of the trip latch 104 which normally engages the rear extension of lever 99 and holds it ineffective. The latch 104 is tripped upon a change in either the minor or major designating field through slide 38, interponent 84, shaft 94 and arm 105 thereon.

The controlling mechanism further comprises the six tooth rachet 106 (see also Fig. 31) also secured to the shaft 97. This ratchet 106 has three pairs of teeth, with a blank space corresponding to a missing tooth between each pair of teeth. The ratchet 96 is a three toothed wheel with a blank space corresponding to a pair of missing teeth between each two teeth. Therefore, one tooth of ratchet 96 and one pair of teeth of ratchet 106 are complementary to each other so that the two ratchets, taken together, operate as a single 9 tooth wheel. The ratchet wheel 106 is actuated by pawl 107, pawl lever 108, push rod 109 and cam 111 on the main shaft 7.

In the rest position of the group total control mechanism the two pawls 107 and 98 are unable to engage the teeth on their respective ratchet wheels 106 and 96 since the pawl 107 slides ineffectively in the blank space on wheel 106 and pawl 98 is held upward by trip latch 104. When, however, the ratchet 96 is advanced one step as a result of the tripping action instituted by control slide 38, ratchet 106 is advanced towards the end of the main shaft revolution and about 330 degrees in phase after the actuation of ratchet 96. Fastened to the shaft 97 are a detent cam 112 (see also Fig. 35), the purpose of which will be described later, and the cam 113 (see also Fig. 27) for operating the retract bail 31 through the arm 114 secured to the shaft 33 Cam 113 also serves to actuate the card stop 10 through arm 115 (see also Fig. 29) secured to the shaft 50. Also fast to the shaft 97 is cam 116 (see also Fig. 30) for controlling the total link 117, the cam 118 (see also Fig. 28) for suspending the card feeding operation through cooperation of members 119, 12, and the positioning detent cam 121 (see also Fig. 36).

Arm 122, fixed on shaft 94, rides with a rounded tooth on ratchet 106 as a cam and will restore the control slide 38 to a position where it may be acted upon by the sensing pin 22, as soon as the tooth of arm 122 is lifted by the advance of a ratchet tooth. The arm 122 is lifted twice during a total taking operation; first, during the second step of ratchet wheel 106 and, again, during the third step of the ratchet. Between the second and third steps of movement of the ratchet wheel 106 an artificial change of designation (later to be described) occurs and the arm 122 is rocked downward only to be raised again as the ratchet moves through its third step. This third step of movement of ratchet 106 is, as will be later described, the normalizing stroke of the total control unit and occurs at a time when the pins 22 are in their highest elevated position. The control slides 38 are thus restored during this normalizing stroke and will not again be actuated until the next change of designation occurs.

The components of the additional or grand total mechanism are fastened together and secured to a sleeve loosely mounted on the shaft 97. A part of this additional mechanism is the ratchet 123 (see also Fig. 32), constructed as an eight tooth wheel and actuated by pawl 124 on the pawl lever 125. This pawl lever is actuated by cam 101 on the main shaft 7 and the other branch 120 of push rod 103. Pawl lever 125 is raised simultaneously with lever 99 when the trip latch 126 is released by arm 127 on the shaft 95. The shaft 95 is rocked only upon a change in the major designating field of the card.

Figure 5:
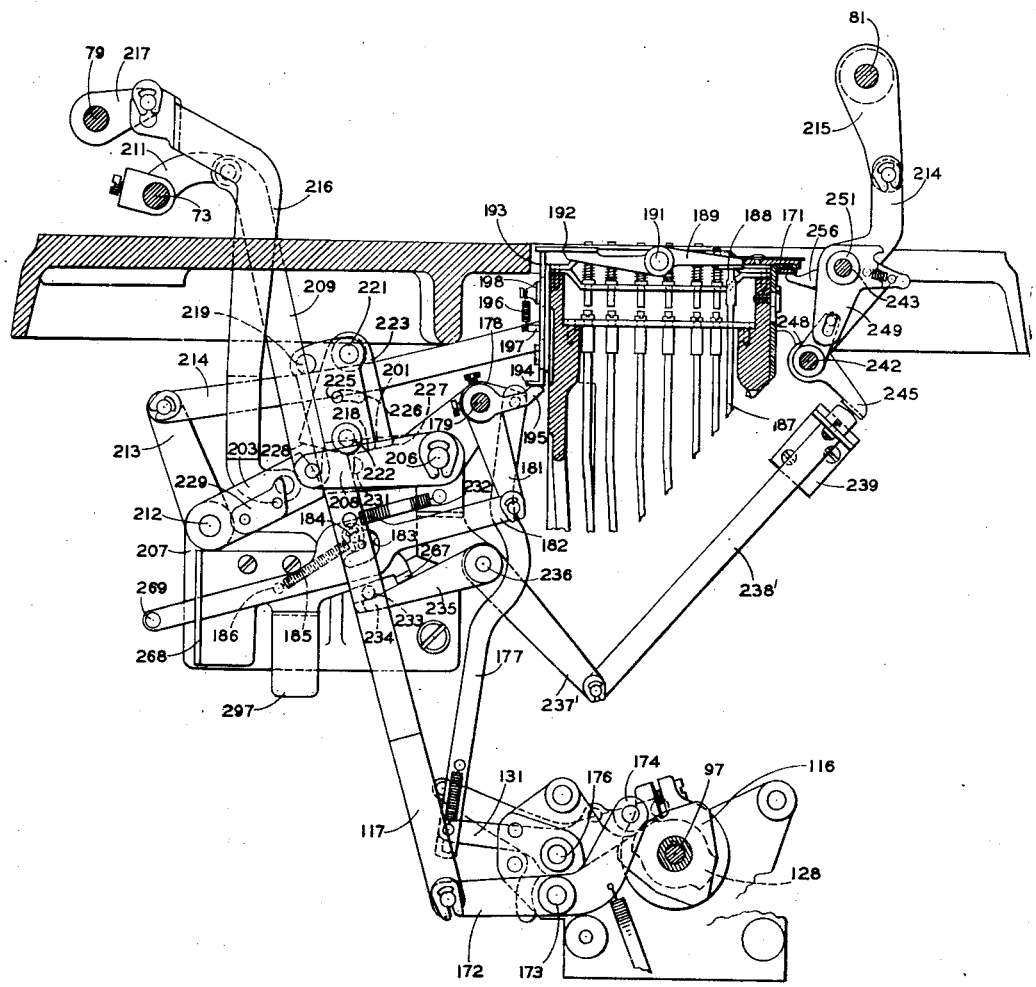
Fig. 5 is a view in elevation and partially sectional, taken from the right hand side of the machine showing certain total control mechanisms of the machine set in position for automatic Y wire grand total work.
Figure 9:
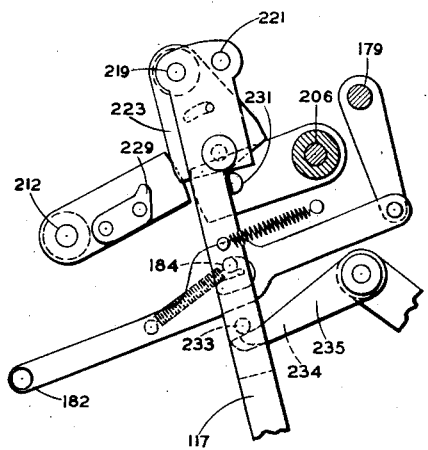
Figure 10:
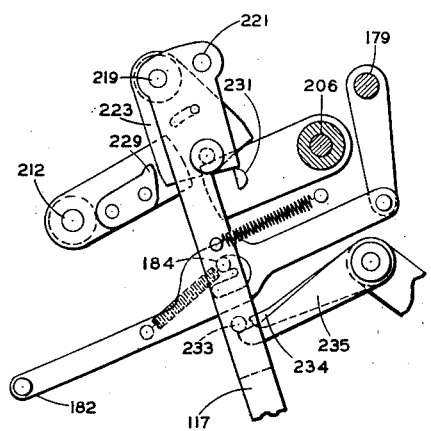
Figure 7:
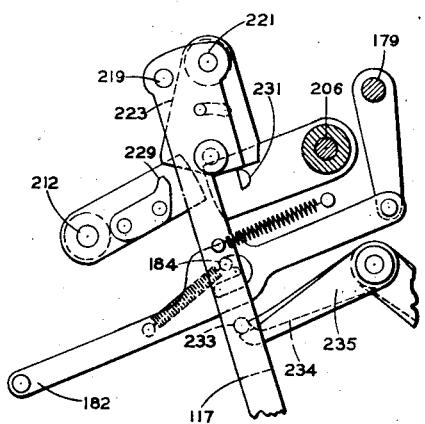

The additional mechanism further comprises cam 128 (see also Fig. 37), which at the beginning of the third stroke of ratchet 123, and by means of cam follower 129 on the arm 131 shifts the total link 117 to grand total position and at the end of the fourth stroke permits it to assume its normal total position. Further mechanism necessary to accomplish this movement is shown in Fig. 5 and will be described later in the specification.

The additional mechanism further comprises a detent cam 132 (see also Fig. 34), one purpose of which is to position the ratchet 123. The cam 132 is provided with eight notches, two deeper ones diametrically arranged for the rest position of the cam, i. e., during regular computing cycles. Intermediary to these deeper notches are arranged three shallower notches corresponding to the three working steps of ratchet 123. Cooperating with the cam 132 is a roller 133 mounted at one end of the lever 134. The lever 134 has rearward extensions 135 and 136. The extension 135 is adapted to cooperate with pin 137 on the grand total trip latch 126 and with the stud 139 on the retaining latch 141, while extension 136 cooperates with pin 142 on the total trip latch 104 and with stud 143 on the retaining latch 144. The extensions 135 and 136 are normally ineffective for cooperation with the above described mechanisms since the roller 133 lies in a deep notch of the cam 132. However, as ratchet 123 is advanced a step, roller 133 rides onto the first of the shallow notches on the cam 132 and extensions 135 and 136 cooperate with their respective pins and studs to hold the trip and retaining latches ineffective to engage the pawl arms 99 and 125. Therefore, ratchets 96 and 123 will be advanced by cam 101, through pawls 98 and 124, during the second, third and fourth position of cam 132.

The retaining latches 141 and 144 are normally blocked from engaging their respective pawl levers 125 and 99. A lever 145 has a roller 146 at one end which follows the periphery of cam 112 of the intermediate mechanism. The lever 145 is formed with a downwardly extending arm 147 carrying a laterally projecting stud 148 which extends across the front of the retaining latches 144 and 141. The cam 112 has three notches corresponding to the rest positions of the mechanism and to those transitory positions in which a group total taking operation is changed over to a grand totaling operation. When roller 146 lies in a notch of the cam 112, latches 144 and 141 are held ineffective by stud 148. When the roller 146 is forced out of the notch and onto the raised part of cam 112, stud 148 will pivot clockwise and allow latches 141 and 144 to follow this clockwise motion by means of springs 149, until they latch over their respective pawl levers 125 and 99.

This release of the retaining latches occurs immediately after the first step of the group total control mechanism and is utilized to prevent actuation of the pawl arms 99 and 125 during the subsequent steps of the control mechanism or until the trip latches 104 and 126 return to their latching position. The artificial change of designation produced by the rising and falling pins of the sensing box while the card is locked in the chamber during a total taking operation is thereby rendered ineffective to release the lever 99 and institute another and undesired total taking operation. It has been seen that the retaining latches 144 and 141 are disabled during grand total cycles in order to permit two successive operations of the group total control mechanism.

A columnar change in the minor designatory field of a card institutes a total taking operation in the following manner: In Fig. 4 the interponent 83a is shown as set to rock the group total bail 86 upon actuation of the minor designatory slide 38. As the slide is moved by the elevation of a new pin 22, the bail 86 is rocked, thereby rotating the shaft 94 counter-clockwise to trip the latch 104 through an arm 105. The pawl lever 99 will, of course, drop and ratchet 96 will be advanced one step as soon as cam 101 raises the push rod 103. The stepping of ratchet 96 will advance cam 113 to disable the locking slides 28, through arm 114, shaft 33 and bail 31, and to lower the card stop 10, through arm 115 on the shaft 50, cam 118 to disable the card feed mechanism, and advance cam 116 within one step of actuating the total link 117. Cam 112 is likewise rotated one step to render effective the retaining latches 144 and 141.

330 degrees of rotation after the actuation of pawl lever 99, push rod 109 will raise pawl lever 108 to advance the total control mechanism a further step. The cams 118, 116 and 113 are advanced a second step also and a total operation is effected by the downward pulling motion of total link 117 in a manner later to be described. After a full rotation of shaft 7, cam 111 will again elevate push rod 109 to advance ratchet 106 a third step to return the group total control mechanism to normal.

This normalizing movement of the total mechanism occurs at a time when the pins 22 are raised to their farthest upward position in which position they are locked by the release of bail 31, and the items they represent are accumulated in the usual manner.

Normal adding of items will continue for the new card series.

As the first card of a new major group designation enters the sensing chamber, a grand total operation will be initiated through the cooperation of slide 38 and an interponent 83b (Fig. 4).

For this purpose the interponent 83b has been set to its lowest position opposite the proper control slide.

The pins 22 of the new designation will cam the control slide 38 to the right (Fig. 4) and rock both bails 86 and 87 counterclockwise, thereby imparting a similar motion to shafts 94 and 95. The latches 104 and 126 will consequently be tripped and pawl levers 99 and 125 will drop only to be raised again by cam 101 through the forked push rod 103, to advance the ratchets 96 and 123 one step. The first step of ratchet 123 advances cam 132 a similar distance, thereby forcing follower 133 into the first shallow notch of said cam. The resulting elevation of extension arms 135 and 136 disables all tripping and retaining latches as previously described.

On advance of ratchet 96, the first step of the group total operation has been initiated which will be completed by the two following steps of the group total mechanism, through the actuation of ratchet 106 as described above. The complete operation takes place during two revolutions of the main shaft.

At the beginning of the second revolution of the main shaft 7, ratchet 123 together with detent cam 132 and shifting cam 128, has been advanced a second step, without effecting a change of operation.

Approximately 30 degrees of rotation of the shaft 7 after the third stepping motion of the group total control mechanism, cam 101 lifts push rod 103 to advance ratchets 96 and 123 the first step of a grand total operation. This step is, of course, equivalent to a first step of the group control mechanism so that the cams associated with said mechanism are actuated accordingly, and before the tabulator drive may eject the card from the sensing chamber and insert a new one therein.

This transitory period covering approximately 30 degrees of rotation of the main shaft 7, occurs at a time when the usual operating mechanism of the machine governing the actuation of the card picker, the card stop and the retract bail is out of position for feeding a card, for releasing the card then held in the sensing chamber or for locking the raised pins 22.

With this step the cam 128 has shifted the pull link 117 to grand total position and the grand total operation will proceed in the same manner as the previously described total operation. The fourth and last step of ratchet 123 brings cam 132 to a "deep notch" position, thus permitting retaining latches 144 and 141 to engage and hold the pawl levers 99 and 125 until the final step of ratchet 106. The third or normalizing stroke of ratchet 106 disables the retaining latches 144 and 141 through stud 148 and conditions the machine for normal item accumulating cycles.

Automatic Y-wire grand total mechanism

The total shaft 73 and the grand total shafts 79 and 81, in the head of the machine, are operated by the control means just described through the total pull link 117 which cooperates with the automatic Y wire grand total control mechanism. This Y wire total control also governs the retention or release of the amounts contained in certain of the accumulating units and is capable of two methods of operation.

The first method hereinafter considered contemplates the use of three front or total accumulating units. The familiar principle of Y wiring in the translator is utilized to introduce the same record simultaneously into the three units. The first unit is used for sub or group totals only and is free to register and clear on the regular group total operation. The second unit is for grand totals and is provided with a naught block 56 (Figs. 2 and 5) for retaining its actuating sectors 47 during a total operation. The third or great grand total unit is prevented from clearing by a similar naught block 171 (Fig. 6) during both total and grand total cycles. The total operating link 117 provides a selective impulse for elevation of the naught blocks 56 and 171.

The operating link 117, hereinafter called the T link, is given a downward pulling motion for every 120 degrees of rotation of the shaft 97. It has been previously stated that the actuation of link 117 is brought about upon the second step of the total control mechanism. The arm 172 is pivoted at 173 with one end connected to the lower end of link 117 and bearing at its other end a roller 174 which follows the contour of cam 116. The T link 117 has three lateral positions in its automatic Y wire grand total operation. In the first or normal position, a total is taken. In the second or intermediate position, a grand total is taken. The third or most leftward position (as viewed in Fig. 5), is used for taking great grand totals. At the time of a grand total cycle the link 117 is shifted to its intermediate position by the cam 128 of the grand total control mechanism. Every 180 degrees of rotation of the grand total control mechanism cam 128 actuates arm 131 pivoted at 176 and resiliently connected to the lower end of link 177. The link 177 is fastened at its upper end to an arm 178 secured to the transverse rock shaft 179. Also fast on the shaft 179 is a depending arm 181 connected to the lever 182. The lever 182 is provided with a U-shaped slot 183 in its mid portion, through which is passed a stud 184 on the T link 117. A spring 185 connected at one end to the stud 184 and at the other to a pin 186 on the lever 182 holds the link 117 and the lever 182 in coactive relation.

Unlike the group totals and grand totals which are taken automatically upon a change in the designating fields of the card, the great grand total is instituted by a control hole in a card particularly inserted in the pack for that purpose.

The translator control wire 187 through which this sensing is transmitted is shown (Fig. 5) contacting an ear 188 on a lever 189 which is pivoted at 191 to the frame of the translator. The lever 189 is formed with another ear or turned over portion 192 at its other end, which contacts and serves to depress a slide 193 slidably mounted on the front of the translator. The lower end of the slide 193 is of such right angle construction as to form a projection 194 which overlies an arm 195 fast to the shaft 179. Elevation of control wire 187 rocks the shaft 179 clockwise a greater distance than is possible by link 177 and will result, therefore, in the positioning of T link 117 in its great grand total position. A spring 196 tensioned between a stud 197 on the slide 193 and a stud 198 on the translator frame serves to return the slide 193 and the lever 189 to normal upon withdrawal of the wire 187. The stud 198 extends through a slot 199 in the slide 193. See also Fig. 6D.

The total pull arm 201 for pulling the total shaft 73, and its counter part 203 for pulling the front and rear grand total shafts 79 and 81, are provided for cooperation with the T link 117. The arm 201 is fast to the shaft 206 which is set in a subordinate main frame member 207. As shown in Fig. 5, counterclockwise movement of the shaft 206 is transmitted through arm 208, link 209 and arm 211 to rock the total shaft 73 clockwise. The grand total pull arm 203 is fast to the shaft 212 also set in the frame 207. The rear grand total shaft 81 is rocked in a counterclockwise direction through arm 213, secured on shaft 212, link 214 and arm 215 fixed to the shaft 81. Fixed to the arm 203 is a link 216 connected to the arm 217 secured to the front grand total shaft 79.

The T link 117 extends upwardly and forwardly in the midsection of the machine and is provided at its upper end with a shoulder 218 on its right hand side (Fig. 5). The link is rounded off at the top and has a circular hole 219 on its front side and a similar hole 221 at its rear side. In back of the T link 117, and pivoted thereon at 222 is a so called selective actuating plate 223. This plate carries a detent plunger 224 (see Fig. 15) which is adapted to be positioned in either of the holes 219 or 221. Referring again to Fig. 5, a stud 225 on the T link head extends through a slot 226 in the selective plate 223 and prevents the latter's overthrow. The bottom of plate 223 is formed with two slightly angled surfaces 227 and 228. When the plate 223 is in its rear position with the plunger 224 in the hole 221, the angled surface 227 of the plate is parallel with, and acts as an extension of, the shoulder 218. When set in its forward position, the angled surface 228 acts as a shoulder for the actuation of the stud 229 on the grand total pull arm 203. The shoulder 218 and the rear plate surface 227 operate the total pull arm 201 through the stud 231 thereon. The spring 232 tensioned between a pin on the T link 117 and a fixed member on the frame 207 is provided to hold the T link in its normal total pulling position. When taking automatic Y wire grand totals by the method under discussion, the parts are set in the position shown in Fig. 5. As shown therein, the surface 228 is in ineffective position and the total pull arm 201 will be rocked in each of the three lateral positions of the T link 117.

*Naught block control*

Referring to Figs. 5 and 6, it may be seen that a stud 233 on the T link 117 is positioned to contact the free end of a pair of arms 234 and 235. The arm 235 is slightly longer than the arm 234 and is fixed to one end of a shaft 236, supported in the subordinate frame 207. Fast to the other end of the shaft 236 is an arm 237 connected at its other end to a long rearwardly extending push rod 238. The push rod 238 is guided in a slotted bracket 239 fixed to the main frame of the machine. The shorter arm 234 is fastened to a sleeve 241 loosely mounted on the shaft 236. Also fixed to the sleeve 241 is an arm 237' which parallels the arm 237 and is connected to a similar push rod 238' also guided in the bracket 239.

As shown in Figs. 5, 6 and 6A there are two transverse operating shafts 242 and 243 mounted in a bracket 244 on the rear of the translator. The upper shaft 243 is actuated on totals only (T link in first position) whereas, the lower shaft 242 is actuated on both totals and grand totals (T link in first and second position).

Loosely pivoted on the shaft 242 is a bell crank 245 with its lower arm extending over the push rod 238' and with its upper arm coupled, through a pin and slot connection, to an arm 246, fast on the shaft 243. An arm 247 overhangs the other push rod 238 and is fast to the shaft 242. Also fixed to the shaft 242 is an arm 248 coupled through a pin and slot connection to the arm 249 on the sleeve 251 loosely mounted on the shaft 243. The arm 249 has a rearwardly extending portion 252 containing two notches 253 and 254, either of which may engage a stud 255 of an elevating finger 256. The finger 256 is slidably mounted on the sleeve 251 and is connected to the members 249-252, inclusive, by a spring 257. With the stud 255 resting in the lower notch 254, the finger 256 is effective to elevate the associated naught block 171. The finger 256 may be disabled from its effective position by manually moving said finger so as to position the stud 255 in the upper notch 253. The assembly comprising arm 248, arm 249, sleeve 251 and finger 256 is adapted to elevate the great grand total naught block 171. Fig. 6B shows the great grand total naught block elevating assembly in cross section. In direct alignment with the unit from which the grand total is to be taken is an elevating assembly comprising a sleeve 258 secured to the shaft 243, an arm 259 fixed to said sleeve, and a finger 261 loosely mounted on the sleeve 258 and connected to the arm 259 by a spring 262. The finger 261 may be set in a manner similar to the setting of finger 256 in effective or ineffective relation to the naught block 56. Fig. 6C shows the finger 261 positioned under the grand total naught block 56. Fig. 6E shows the means for urging both shaft 242 and 243 to normal position. Spring 263, tensioned between arm 264 secured to shaft 243 and arm 265 fixed on shaft 242 keeps the shafts in normal position. Limit studs 266 on the bracket 140 are provided to prevent the respective shafts from being pulled into a subnormal position by the spring 263.

Figs. 7 to 13, inclusive, are a series of partial sectional elevations, and illustrate the position described below.

When the T-link is pulled during a total operation (Fig. 5), the stud 233 picks up and actuates both arms 234 and 235. This motion is transmitted through the above described linkage to both shafts 242 and 243. Thus, both naught blocks 56 and 171 are raised and the values accumulated in the grand and great grand total units are retained during the total operation. However, when the T-link 117 is shifted into and pulled in its grand total position (Fig. 7), only the longer arm 235 is actuated. The result is that the shaft 242 is rocked to block out the great grand total unit while the grand total is allowed to be cleared in its normal operation.

When a great grand total is taken and the T-link is pulled in its third position (Fig. 8), the stud 233 clears both arms 234 and 235 so that all three accumulating units are free to register and be cleared. An earlike projection 267 on the guide frame 268 acts as a stop for the arms 234 and 235.

An alternative method of automatic Y wire grand total control utilizes the total accumulators of two separate units for accumulating and registering the total and grand total and utilizes the grand total accumulator of the same unit from which the grand total is taken, for accumulating and registering the great grand total. This method permits the use of double, instead of triple, Y wiring.

Figure 11:
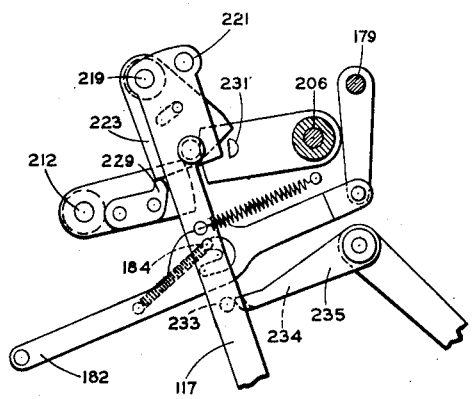

The selective actuating plate 223 is shifted to the front with the detent plunger 244 located in hole 219. The shoulder 218 will now actuate the total stud 231 in both the total and grand total pulling positions of the T link 117 (Figs. 9 and 10), whereas the front angled surface 228 of the plate 223 creates a shoulder sufficient to engage and pull the grand total linkage on great grand totals (Fig. 11). During a great grand total operation only the grand total shafts 79 and 81 are rocked, the lower rear edge 227 of the plate 223 being elevated sufficiently to clear the total stud 231. With the mechanism set to function in the above manner, the elevating finger 256 for blocking the great grand total unit may be disabled.

A suitably perforated control card institutes a great grand total cycle in the second method of operation as well as the first. A blank card is inserted in the pack immediately preceding the control card so that the total and grand total accumulators may be cleared before the great grand total is taken. During the machine cycle in which the blank card is in the sensing chamber, the change-of-designation slides governing both total and grand total operation will be actuated by the descending pins 22 of the upper sensing box.

The blank card may, if desired, be omitted and the control card sensed immediately after the last record card. It is apparent that in this case the total link 117 will be shifted to its great grand total position, the descending pins 22 will cause a total operation and all of the front accumlators will be released simultaneously to print their respective amounts.

In the automatic Y wire grand total control of the first method the sum of all the great grand totals will be accumulated in the new totalizer of the same unit from which the great grand total is taken.

This final total may be released to print and clear by setting the variable automatic stopping means (now to be described) to halt the machine after great grand totals. The selective actuating plate 223 is then set to its forward position, as in the second method, and the machine again started. The first card to be sensed should be a control card similar to the one used for initiating a great grand total. The T-link 117 will be shifted to its farthest lateral position and the grand total pull arm 203 will be actuated through the stud 229 on said arm and the angled surface 228 of the actuating plate 223.

The above described mechanism for taking grand and great grand totals through automatic Y wire control may, if desired, be disabled to permit regular group total and grand total operation. The lever 182 is guided in the frame 268 and has, at its outer end, a handle 269. The U-shaped slot 183 in the lever 182 is constructed with its lower portion longer than the upper. Through the resilient connection provided by spring 185, the stud 184 on the T-link 117 may be positioned in either the upper or lower position of the slot by manual movement of the lever 182. With the stud 184 positioned in the lower portion of the slot 183, the T-link 117 assumes a normal position (Fig. 12) which is equivalent to the intermediate position of the link in automatic Y wire grand total control.

Figure 12:
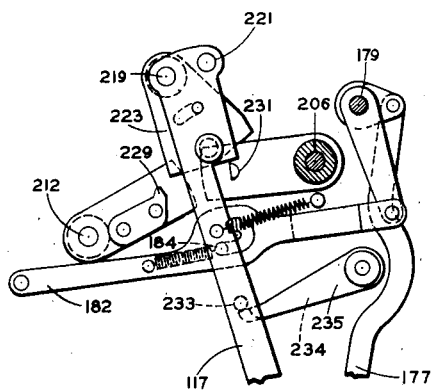
Figure 13:
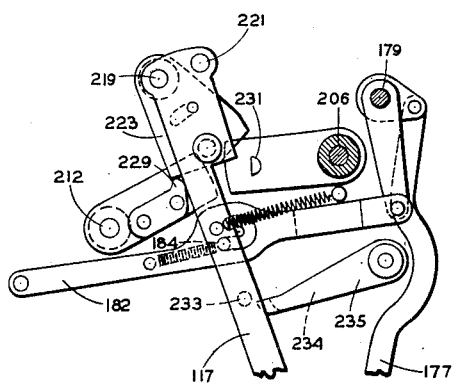

With the selective actuating plate 223 shifted into its forward position and the disabling lever 182 set with the stud 184 of T-link 117 in the lower end of U-shaped slot 183, the subject mechanism will function as though the standard total pull link were attached (Figs. 12 and 13). In addition to the two settings just described, the naught block elevating fingers on the translator must be disabled, that is, if the same translator is used.

*Automatic stopping machine*

A variable automatic stopping means has been designed for cooperation with the improved total taking means hereinbefore described and which may also be used with the machine set for regular group and grand total work.

The stopping means is embodied in a device illustrated in Figs. 14 and 15 and provides certain selective mechanism for transmitting the motion of the T-link 117 to the usual tabulator stopping means disclosed in the previously mentioned Lasker Patent No. 2,044,119.

A portion of the stopping means therein disclosed is shown in Fig. 16 of this application and hereinafter briefly described.

The machine is driven by the usual electric motor, (not shown) which is connected to the main shaft 7 by means of a suitable gear train and a clutch. The clutch (also not shown) is controlled by the shaft 271 which extends through the machine into the frame box 272 where it has a horizontal arm 273 which is connected by a vertical link 274 with a lever 270 mounted on top of the frame box 272. The parts are shown herein in their operating position with the machine running. In order to stop the machine, link 274 is forced downward rocking the arm 273 against the tension of a spring (not shown) to disengage the clutch and stop the machine. The clutch is locked in disconnect position by a pawl 275 pivoted to the wall of the frame 272, which pawl catches over a lug 276 projecting from the side of the link 274, the pawl being controlled by a spring 277.

It is desirable that the machine always be stopped in the same position, namely, that in which the picker is in its extreme retracted position ready to feed a card into the machine. To this end the clutch is not released directly by hand but is released by the circular cam 34 mounted on the drive shaft 7 and having a projection 279 which operates a follower roller 281 on the lever 35 pivoted at 283 to the frame 272, and said lever acting when operated to push upward a link 284 which, at its upper end, is guided in plate 285 secured to the upper surface of the boxlike frame member 272.

For purposes of adjustment, the lever which operates the link 274, is made in two pieces, both pivoted at 286. The lever 270 is one of these pieces and the other is a lever 287 of the first order having an ear 288 bent over the lever 270 and an adjusting screw 289 bearing on the upper surface of lever 270, the two levers being held in normal relation by a spring 291 which connects them. At its rearward end the lever 287 has a lug 292 adapted, on occasion, to be engaged by the end of a link or interponent 293 which is pivoted at 294 to an arm 295, which arm is secured to a rock shaft 296. The interponent 293 rests on the upper end of the push link 284 and it normally stands with its rear end forward of the lug 292, but by rocking the arm 295 rearward this interponent will be moved under the lug 292. As long as the interponent occupies its normal position, the machine can go through cycle after cycle without interruption. The interponent 293 will be moved upward once each rotation of the main shaft, but idly. If by any means the lever 295 be swung rearward, bringing the interponent 293 under the lug 292, then, when in the rotation of the shaft 7 the projection 279 strikes the roller 281, link 284 will move interponent 293 upward which will in turn rock the levers 287, 270, depress the link 274, and disengage the clutch.

It will be perceived that anything which swings the arm 295 or its shaft 296 clockwise and holds it there until projection 279 strikes the roller 281, will stop the machine. Shaft 296 may, therefore, be called the stop shaft of the machine. Several devices for rocking shaft 296 and its arm 295 are used in the tabulator.

The machine of this application also utilizes the function of shaft 296 in connection with the variable automatic stopping means described below.

As shown in Fig. 14 the guide frame 268 has a projecting earlike portion 297 to which is secured a semi-circular drumlike member or plate 298. The rounded edge of plate 298 is encompassed by a casing 299 fastened, as at 301 and 302, to opposite ends of the member 298. Carried in the mid portion of the plate 298 is a short stub shaft 303 surrounded by a loosely mounted collar 304. A bellcrank composed of arms 305 and 306 is fast to the collar 304. On the arm 306 is secured, at screw points 307 and 308, another drum member 309. This drum is composed of plate, casing and connecting screws in a manner similar to member 298 and is adapted to move in an arclike motion just inside the casing 299 of the outer drum. The arm 305 carries a detent plunger 311 at its upper end. Spaced at varying intervals near the edge of the plate 298 are six perforations or index positions (see also Fig. 17) any one of which may engage one end of the plunger 311. The arm 305 is, therefore, adaptable to a manual manipulation whereby its plunger 311 may be selectively located in any of the six index positions, thereby effecting a corresponding movement of the drum 309.

Also fast to the collar 304 (Fig. 14) is an arm 312 extending in an opposite direction to the arm 305 and carrying at its lower end a pin 313. A lever 314 is pivoted at 315 to the T-link 117 and is formed with an elongated slot 316 at one end which engages the pin 313. At its other end the lever 314 carries an arm 317 which is fastened to said lever by screw and slot connections 318 and 319 in order to permit a slight vertical adjustment. Projecting horizontally from the lower end of arm 317 is a pin 321 intended for selective cooperation with an upturned cam face 322 on a lever 323. The lever 323 is loosely mounted on the shaft 296 and has a rearwardly extending portion 324 which normally rests on a stud 325 on the arm 326. The arm 326 is fast to the shaft 296 and through linkage not shown herein is controlled by the no card stop pin in the sensing chamber. A spring 327 tensioned between the stud 325 and a pin 328 on the portion 324 tends to hold the lever 323 in its normal position. The rocking of lever 323 rotates the shaft 296 counterclockwise, as shown in Fig. 14 to set in motion the stopping mechanism previously described. As was previously described the link 117 is depressed at the start of the total cycle and remains depressed throughout the entire cycle. The cam 34 (Fig. 16) which provides the impulse for operation of the stopping mechanism elevates its link 284 at approximately the end of each machine cycle. Thus, although the machine is conditioned to stop at the beginning of the total cycle, the clutch will not actually be disengaged until the total has been taken.

In order that the pin 321 may engage the lever 323 only at definite predetermined times, the casing of the inner drum 309 is stamped with two vertical columns of total indications (Fig. 18). The casing 299 of the outer drum is provided with an opening 329 (Fig. 15) through which one horizontal row of indications may be read at a time. By means of the plunger 311 the drum 309 may be rotated either forward or backward until the desired indication appears in the opening 329. Then the plunger 311 is released to allow it to enter the corresponding index position. The opening 329 is suitably formed and marked to distinguish between regular group and grand total operation and the automatic Y wire grand total control.

It is evident that the manually instituted motion of arm 305 is transmitted to the arm 317 through the above described linkage so that the pin 321 on the arm 317 may assume a variety of different positions with respect to the cam face 322. It may also be seen that the arm 314 and its dependent parts may be moved laterally by reason of the pivot connection at 315 to the T-link 117.

The total taking cycles during which the variable stopping means is effective are indicated for each index position in Fig. 18. As shown therein the first index position is not used in regular group and grand total operation whereas with automatic Y wire grand total control the machine will stop after totals only (Fig. 14). In the second index position and during regular operation the stopping means is effective after totals (full lines in Fig. 19). The dotted portion of Fig. 19, marked "A", represents the lower part of the T-link 117 and its associated parts in grand total pulling position. Still considering the second index position, it may be seen (Fig. 20) that during automatic Y wire grand total operation, the stopping device will function effectively on totals and grand totals but will be ineffective on great grand totals. Dotted portions A and B indicate respectively the grand and great grand total T-link position.

Figure 21:
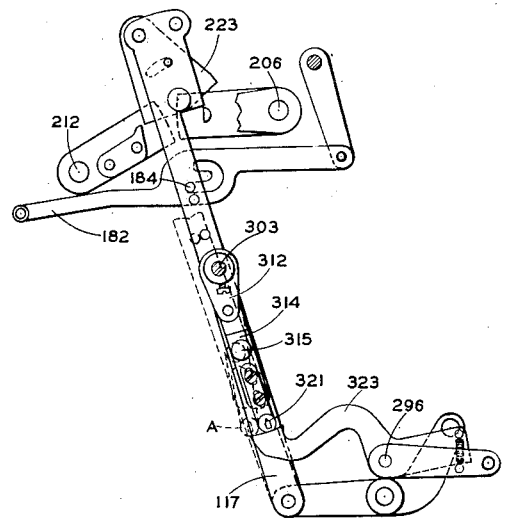
Figure 23:
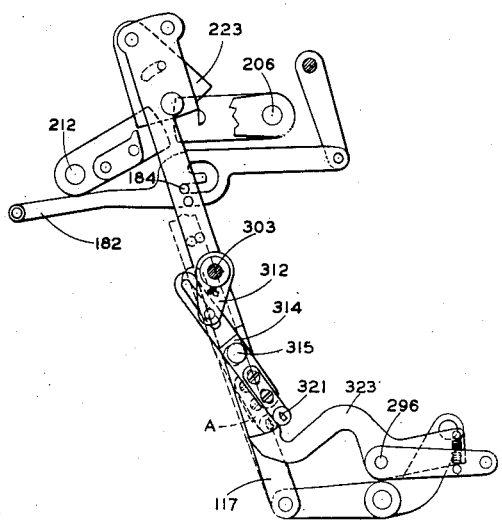
Figure 20:
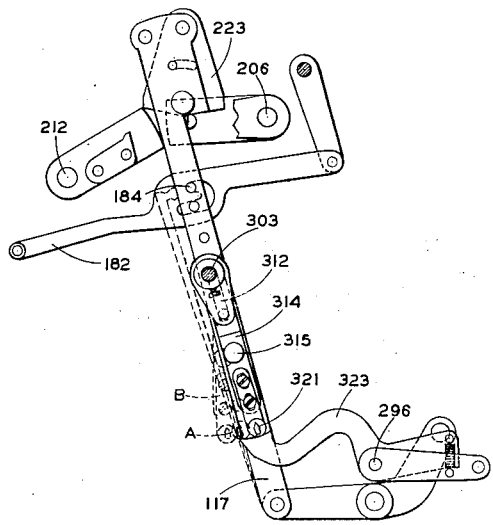

The third index position is used during regular operation to stop the machine after both totals and grand totals (Fig. 21). This position is not used in Y wire totaling.

The fourth index position is not used in regular total operation, while in the Y wire control it acts to set the parts for effective operation after grand and great grand totals (Fig. 22), the total position being ineffective.

Figure 24:
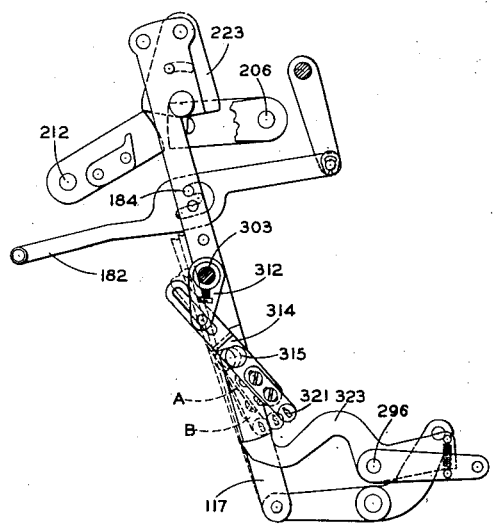

The fifth index position serves to stop the machine after grand totals only in regular operation (Fig. 23), and after great grand totals and great great grand totals when used in a Y wire total operation (Fig. 24).

The variable automatic stopping means may be rendered completely ineffective by placing the arm 305 in the sixth and rearmost index position.

Figure 25:
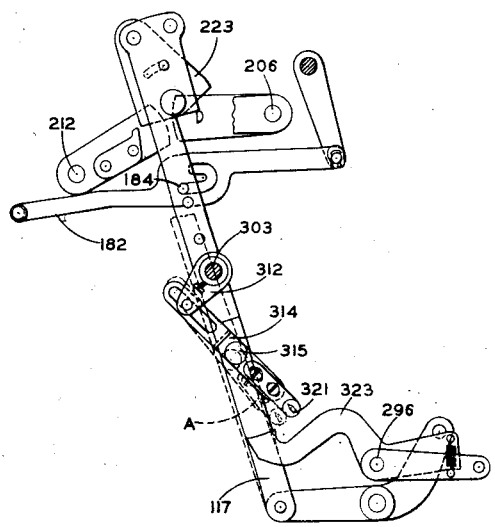

As shown in Fig. 25, the stud 321 passes harmlessly by the lever 323 in all positions of the T-link.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a tabulating machine, the combination of mechanism for automatically stopping the machine including a control element adapted when operated to condition said stopping mechanism for operation, an actuating element movable to a plurality of actuating positions, means for actuating said element in any of its actuating positions, means operable by said actuating element in each of its plurality of positions for operating the above said control element, and means for rendering said last mentioned means alternatively effective or ineffective in any of the actuating positions of said actuating element at the will of the operator.

2. In a machine of the class described, the combination of an accumulator, actuators therefor, a train of mechanism for controlling the engagement and disengagement of said accumulator and said actuators, said train of mechanism being normally set to cause the entry of amounts into said accumulator, means for setting said train of mechanism to cause a total to be taken from said accumulator, means for operating said setting means including an actuating element connected to said setting means, mechanism for automatically stopping the machine including a control element adapted when operated to condition said stopping mechanism for operation, a second actuating element movable with said first mentioned actuating element, and means operable by said second actuating element for operating said control element.

3. In a machine of the class described, the combination of an accumulator, actuators therefor, a train of mechanism for controlling the engagement and disengagement of said accumulator and said actuators, said train of mechanism being normally set to cause the entry of amounts into said accumulator, means for setting said train of mechanism to cause a total to be taken from said accumulator, means for operating said setting means including an actuating element connected to said setting means, mechanism for automatically stopping the machine including a control element adapted when operated to condition said stopping mechanism for operation, a second actuating element movable with said first mentioned actuating element, means operable by said second actuating element for operating said control element, and means for setting said second actuating element to a plurality of positions relatively to said last mentioned means whereby said second element may be alternatively rendered effective or ineffective.

4. In a machine of the class described, the combination of a plurality of accumulators, actuators for each of said accumulators, a train of mechanism associated with each of said accumulators for controlling the engagement and disengagement of said accumulators and said actuators, each train of said mechanism being normally set to cause the entry of amounts into its respective accumulator, independently operable means for setting each of said trains of mechanism to cause a total to be taken from its respective accumulator, means for operating said independently operable means including a settable actuating element effective when set in one position to operate one of said independent means and effective when set in another position to operate another of said independent means, mechanism for automatically stopping the machine including a control element adapted when operated to condition said stopping mechanism for operation, a second actuating element movable with said first mentioned actuating element, means operable by said second actuating element for operating said control element, and means for setting said second actuating element to a plurality of positions relatively to said last mentioned means whereby said second element may be alternatively rendered effective or ineffective in each position of said first actuating element.

5. In a machine of the class described having mechanism for automatically stopping the machine including a control element adapted when operated to condition said stopping mechanism for operation, the combination of an actuating element for controlling a machine operation, a second actuating element movable with the first actuating element and adapted to operate said control element, and manipulative means for setting said second actuating element to a plurality of positions relatively to said first actuating element whereby said second element may be alternatively rendered effective or ineffective to operate said control element.

6. In a machine of the class described, the combination of a plurality of accumulators, a set of actuators for each of said accumulators, means individual to each of said accumulators for controlling the engagement and disengagement of each of said accumulators and its actuators, each of said means being normally set to cause the entry of amounts into its respective accumulator, means for setting all of said individual controlling means to cause the total to be taken from their respective accumulator simultaneously, means for operating said setting means including an actuating element movable to a plurality of positions relatively to said setting means and effective in each relative position to operate said setting means, means operable by said actuating element in two of its relative positions for blocking the movement of one set of said actuators, means operable by said actuating element in one of its relative positions for blocking the movement of another set of said actuators, mechanism for automatically stopping the machine including a control element adapted when operated to condition said stopping mechanism, a second actuating element movable with said first actuating element, means operable by said second actuating element for operating said control element, and means for setting said second actuating element to a plurality of positions relatively to said last mentioned means whereby said second element may be alternatively rendered effective or ineffective in each of the relative positions of said first actuating element.

7. In a machine of the class described, the combination of a plurality of accumulators, record controlled means for entering amounts into said accumulators, a second record controlled means for controlling the machine for total taking including a settable actuating element normally positioned to cause a total to be taken from one of said accumulators, additional record controlled means for causing successive operations of said second record controlled means and for positioning said settable actuating element to cause a total to be taken from another of said accumulators during the second operation of said second record controlled means, mechanism for automatically stopping the machine including a control element adapted when operated to condition said stopping mechanism for operation, a second actuating element movable with said first mentioned actuating element, means operable by said second actuating element for operating said control element, and means for setting said second actuating element to a plurality of positions relatively to said last mentioned means whereby said second element may be alternatively rendered effective or ineffective during each of the successive operations of said total controlling means.

8. In a machine of the class described, the combination of a plurality of accumulators, record controlled means for entering amounts into said accumulators, a control element associated with each of said accumulators and adapted when operated to cause the total to be taken from its associated accumulator, a second record controlled means for operating said control elements including a settable actuating element normally set in position to operate one of said control elements, additional record controlled means for causing successive operations of said second record controlled means and for setting said actuating element in position to operate another of said control elements during the second operation of said second record controlled means, mechanism for automatically stopping the machine including a control device adapted when operated to condition said stopping mechanism for operation, a second actuating element movable with said first mentioned actuating element for operating said control device, and means for setting said second actuating element to a plurality of positions relatively to said first actuating element whereby said second element may be alternatively rendered effective or ineffective in each position of said first element.

9. In a machine of the class described having mechanism for automatically stopping the machine including a control element adapted when operated to condition said stopping mechanism for operation, the combination of card sensing means, means controlled by said sensing means for detecting a change in group designation of the record cards, a cam, means under the control of said detecting means for imparting a step-by-step movement to said cam, and means operable by said cam for operating said control element.

10. In a machine of the class described having mechanism for automatically stopping the machine including a control element adapted when operated to condition said stopping mechanism for operation, the combination of card sensing means, means controlled by said sensing means for detecting a change in group designation of the record cards, a cam, means under the control of said detecting means for imparting a step-by-step movement to said cam, means operable by said cam for operating said control element, and manipulative means for rendering the last mentioned means alternatively effective and ineffective.

11. In a machine of the class described having mechanism for automatically stopping the machine including a control element adapted when operated to condition said stopping mechanism for operation, the combination of card sensing means, reading retaining means including a plurality of elements settable by said sensing means in accordance with record perforations, means responsive to a change in the setting of said settable elements for initiating a total taking operation, including a cam and means under the control of said elements for imparting step by step movement to said cam, and means operable by said cam for operating said control element.

JOHN T. FERRY.

CERTIFICATE OF CORRECTION.

Patent No. 2,185,841. January 2, 1940.

JOHN T. FERRY.

It is hereby certified that error appears in the printed specification of the above numbered patent requiring correction as follows: Page 4, second column, line 72, after the reference numeral "33" insert a period; page 8, second column, line 18, in the sub-heading, for the word "machine" read --mechanism--; page 10, second column, line 59-60, claim 6, after "mechanism" and before the comma, insert --for operation--; and that the said Letters Patent should be read with this correction therein that the same may conform to the record of the case in the Patent Office.

Signed and sealed this 3rd day of September, A. D. 1940.

(Seal)
Henry Van Arsdale,
Acting Commissioner of Patents.